Dec. 24, 1968 H. E. HOFFERBER 3,418,490

EASY ENGAGE SWITCHING CIRCUIT USING SIGNAL CHOPPING

Filed Sept. 8, 1965 2 Sheets-Sheet 1

INVENTOR.
HENRY E. HOFFERBER
BY
S. C. Yeaton
ATTORNEY

Dec. 24, 1968 H. E. HOFFERBER 3,418,490

EASY ENGAGE SWITCHING CIRCUIT USING SIGNAL CHOPPING

Filed Sept. 8, 1965 2 Sheets-Sheet 2

INVENTOR.
HENRY E. HOFFERBER
BY
S. C. Yeaton
ATTORNEY

United States Patent Office 3,418,490
Patented Dec. 24, 1968

3,418,490

EASY ENGAGE SWITCHING CIRCUIT USING SIGNAL CHOPPING

Henry E. Hofferber, Phoenix, Ariz., assignor to Sperry Rand Corporation, a corporation of Delaware Filed Sept. 8, 1965, Ser. No. 485,830
13 Claims. (Cl. 307—202)

ABSTRACT OF THE DISCLOSURE

An "easy engage" switching circuit in which the input signal is repetitively interrupted and first applied to the load in short pulses. The duration of these pulses is gradually increased until the entire uninterrupted input signal is finally applied to the load.

This invention relates to electrical switching circuits and more specifically to electrical switching circuits capable of providing prolonged switching times.

Situations frequently arise in which it is desired to apply a signal to a load gradually even though the signal is in the form of a pulse having a steep wavefront.

In various control applications, for instance, the controlled device can be switched between automatic and manual control at the will of the operator. If the system is switched from the manual to the automatic mode of operation at a time when a large error signal happens to exist, the controlled device is subjected to abnormally high transient forces so that the resulting shock may cause damage or failure of the equipment.

Various types of damped switching circuits or "easy engage" control circuits have been devised to solve this problem so that an error signal may be applied to the controlled device gradually even though the signal itself is applied abruptly to the switching circuit.

According to one scheme for providing damped switching, the DC error signal must be modulated, amplified, and again demodulated. This involves complex circuits which reduce the reliability of the system.

Other schemes rely on the nonlinearity of the characteristic curves of transistors or similar electron devices to provide gradual application of the error signal. But since the operation of a device using this scheme depends upon circuit characteristics which are influenced by ambient conditions and by aging, the entire switching circuit suffers from poor stability.

Furthermore, many of these prior art circuits are unable to accept DC error signals of both polarities unless additional circuit elements are employed. This adds to the complexity, weight, and cost of the switching means.

It is an object of the present invention to provide a highly stable damped switching circuit.

It is another object of the present invention to provide a damped switching circuit that can operate on either polarity of DC input signal.

It is another object of the present invention to provide a damped switching circuit that requires a minimum of elements.

It is still another object of the present invention to provide a damped switching circuit in which the signal applied to a load changes linearly with respect to time during a transition from one operating mode to the other.

These and other objects are achieved by repetitively interrupting the full error signal according to a predetermined schedule so that the average error signal energy reaching the load varies at a desired rate.

Figure 1:
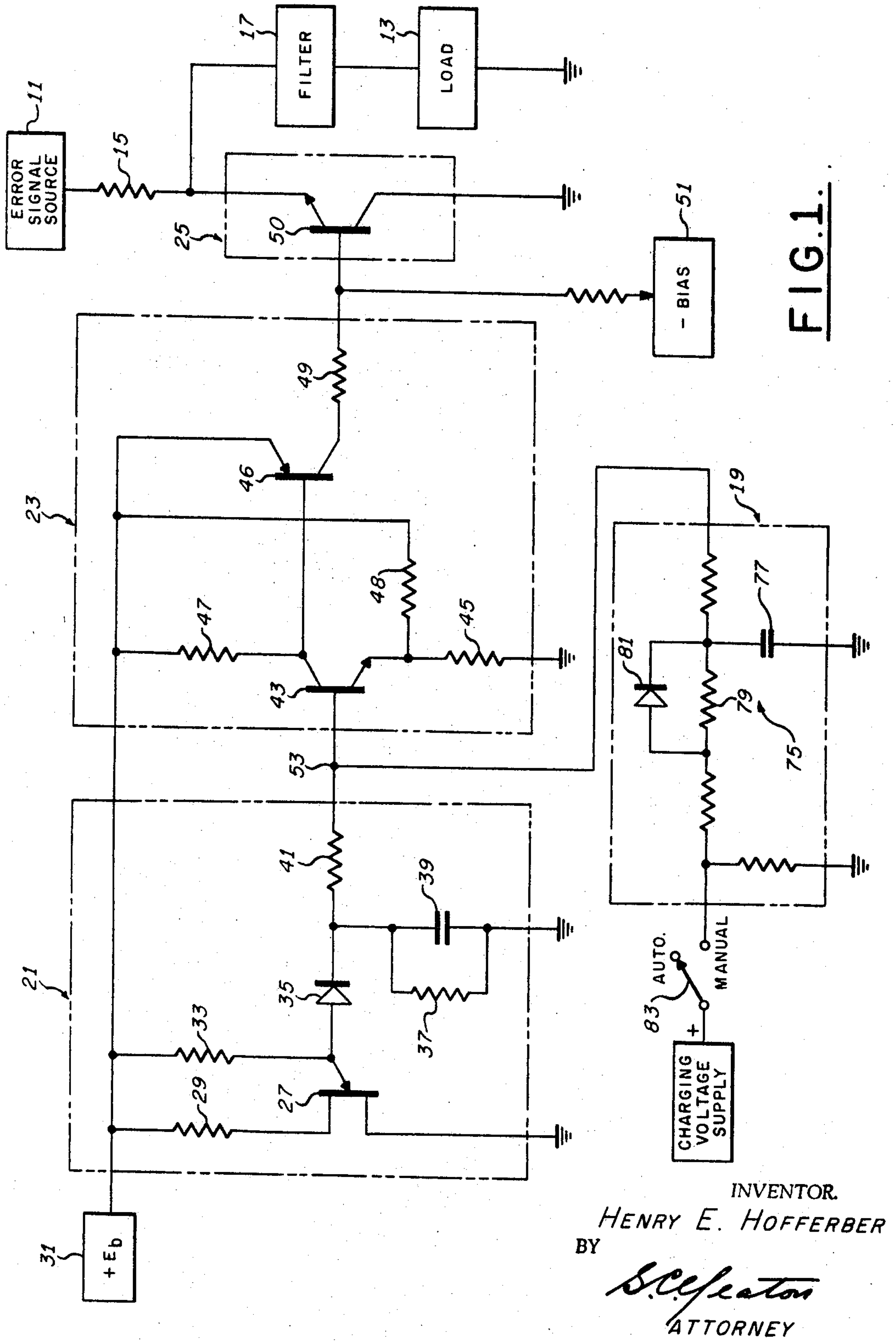
Figure 2:
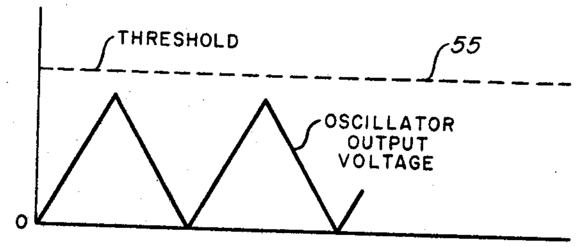
Figure 3:
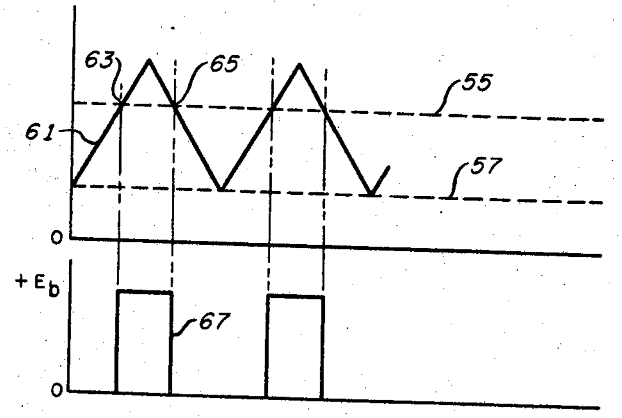
Figure 4:
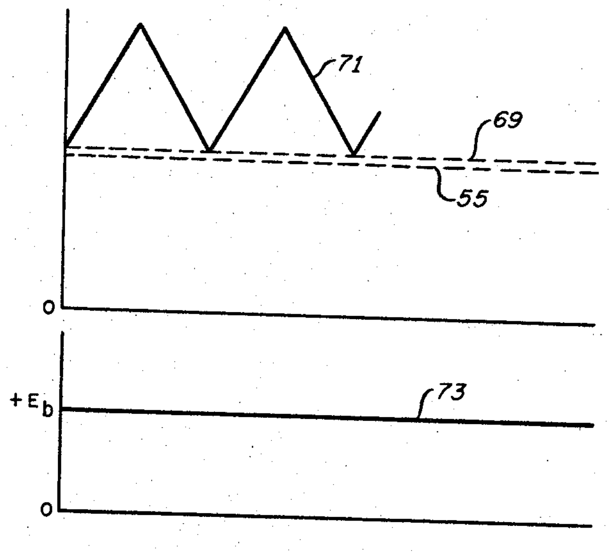

The principles and operation of the present invention may be understood by referring to the following description and the accompanying drawings wherein:

FIG. 1 is a circuit diagram illustrating a presently preferred embodiment of the invention, and FIGS. 2–4 are diagrams useful in explaining the operation of the embodiment of FIG. 1.

The presently preferred embodiment of the invention is illustrated in FIG. 1. A source of error signals 11 is coupled to a device to be controlled, represented as a load 13, through a series resistor 15 and a filtering network 17. The damped switching circuit of the invention consists basically of a control means 19, an oscillator 21, a squaring amplifier 23, and a chopping means 25. The source of error signals 11 is shown in block form. In practical applications, the error signal is normally derived from a sensor that detects an error which is to be corrected.

The oscillator 21 as presently preferred, consists of a generator of triangular waves. As pictured in FIG. 1, this generator contains a unijunction transistor 27 connected through a series resistor 29 to the positive terminal of a suitable source of supply voltage 31. The transistor 27 also has its emitter electrode connected through an emitter resistor 33 to the same source of voltage. The emitter is further connected through a diode 35 to a resistor 37 connected in parallel with a timing capacitor 39.

The particular type of triangular wave generator depicted in FIG. 1 is of a type well-known in the art. The design and operation of such generators is discussed, for instance, on pages 312–320 of the 7th edition of the G.E. Transistor Manual, published by the General Electric Company in 1964. The shape of the triangular output wave from such a generator is determined by the values selected for the various resistors and the capacitor used in the circuit. In the circuit presently used, these components are selected to provide a triangular wave shape having equal rise and fall times.

The output of the oscillator is applied to the squaring amplifier 23 through a resistor 41. The squaring amplifier contains an input transistor 43 which is connected to ground through an emitter resistor 45 and to the source of supply voltage through a collector resistor 47. The emitter electrode is also connected to the supply 31 through a resistor 48.

The resistors 45 and 48 form a voltage divider to bias the transistor 43 at a level such that the peak-to-peak output voltage of the oscillator 21 is less than the emitter bias. Thus the oscillator output voltage alone is insufficient to drive the transistor 43 out of its normally cut-off condition.

The collector electrode of the transistor 43 is further connected to the base of a switching transistor 46. The emitter of this transistor is connected directly to the supply voltage source 31. The collector element of the switching transistor 46 is connected to the chopping means 25 through a resistor 49. A small output voltage from the input transistor 43 is sufficient to saturate the output switching transistor 46. Thus, any input voltage applied to the transistor 43 that just exceeds the threshold imposed by the bias voltage divider will produce a positive-going, square-topped output signal from the amplifier, and this output signal will persist all during the time that the input signal exceeds the threshold.

The chopping means 25 as presently preferred, contains a chopping transistor 50. The emitter electrode of this chopping transistor is connected to the output side of the resistor 15 and the collector electrode of this transistor is grounded. The base of the chopping transistor 50 is connected to a source of biasing voltage 51 that holds this transistor normally in the cutoff condition. The magnitude of the biasing voltage from the source 51 is made sufficiently large so that the chopping transistor will remain in the normally cutoff condition regardless of the magnitude of any error signal that may be applied within the expected range. This will be accomplished in the circuit shown if the source 51 provides a bias more negative than the largest negative error signal that is to be accommodated. In a specific circuit, in which error signals in the range between plus and minus 2 volts are to be expected, the supply 51 was designed to provide a bias of minus 3 volts. Since this bias can be made equal to any reasonable value, comparatively large error signals of either polarity can be accommodated.

The control means 19 produces a positive adjustable DC control voltage which is added to the output of the oscillator 21 at a summing point 53. When the control voltage is added to the triangular wave from the oscillator 21, the quiescent voltage of this triangular wave is displaced upward so that an offset triangular voltage wave is applied to the base of the input transistor 43.

Because of the biasing means connected to the emitter of the transistor 43, this transistor will remain in the cutoff condition until the control voltage reaches sufficient magnitude to cause the peaks of the offset triangular voltage wave to overcome the bias of the transistor 43. The transistor 43 will remain in the conducting state only during the time that the instantaneous value of the offset triangular voltage wave exceeds the threshold value. While the transistor 43 is conducting, the squaring amplifier produces an output voltage that serves as a chopping signal to saturate the chopping transistor 50. While the chopping transistor is saturated, any error signals that occur will be shorted to ground through the chopping means. The circuit will remain in this condition until the offset triangular voltage wave again drops below the threshold, When this occurs, the transistor 43, the switching transistor 46, and the chopping transistor 50 will return to their respective cutoff conditions. The error signal from the source 11 can now flow through the filter 17 to the load 13.

The operation of the circuit can be visualized by referring to the graphs of FIGS. 2–4.

FIG. 2 represents the condition when no control voltage is being produced by the control means 19. The threshold level is indicated in FIG. 2 as the horizontal dashed line 55. This threshold level, it will be remembered, is set by the bias applied to the transistor 43. As indicated in FIG. 2, the theshold level is above the peak value of the triangular wave developed by the generator 21. Since the output of the oscillator 21 under these conditions is insufficient to overcome the bias voltage, the squaring amplifier 23 can produce no output signal and the chopping transistor 50 remains cutoff. Any error signal developed by the source 11 passes directly to the load 13.

FIG. 3 represents the circuit conditions when a small DC control signal is developed by the control means 19. This DC voltage is indicated by the dashed horizontal line 57. Under these conditions the triangular output wave is shifted upward from its original position to an offset position 61.

The offset triangular voltage wave 61 now penetrates the threshold level 55 at the point 63 and remains above this threshold level until it again descends through the threshold at the point 65. During the time that the offset triangular voltage is above the threshold 55, the transistor 43 is driven out of its cutoff condition. This causes the switching transistor 46 to saturate, and produces a rectangular voltage wave 67 at the output of the squaring amplifier.

The rectangular output from the squaring amplifier saturates the chopping transistor 50 which diverts any error signal from the source 11 to ground. Thus, the error signal is prevented from reaching the load at any time in which the instantaneous value of the offset triangular wave exceeds the threshold.

FIG. 4 illustrates the situation in which a large control voltage is produced by the control means 19. Under these conditions, the DC control voltage has increased to a value represented by the horizontal dashed line 69. This produces an offset triangular voltage wave 71 which remains above the threshold 55 at all times. This in turn, produces a steady squaring amplifier output 73.

Under these conditions, the chopping means presents a continuous short circuit so that any error signal from the source 11 is prevented from reaching the load 13.

When the controlled device is to be operated in the manual mode, the control means 19 is set to provide maximum control voltage. This is the condition depicted in FIG. 4, in which any error signal that occurs is shunted around the load.

When the controlled device is to be switched to the automatic mode of operation, the control means is adjusted for gradual reduction of the control voltage according to a desired schedule. This lowers the offset triangular voltage wave through the threshold. As the lower portions of the triangular wave drop below the threshold, the output of the squaring amplifier is interrupted for progressively longer periods of time. During these interruptions, any error signal that is being produced can reach the controlled device. The full amplitude of any error signal that is being produced reaches the filter 17 in initially short bursts, but these bursts gradually increase in duration until the full error signal is applied continuously to the controlled device. The controlled device is then completely in the automatic mode of operation.

In the presently preferred embodiment of the inventio, the filter 17 is used to provide a smoothed DC voltage that varies substantially linearly with respect to time during the transition from one operating mode to the other. The filter may, for instance, contain a conventional resistance-capacitance network employing a shunt capacitor.

When the control device is to be switched to the automatic mode of operation, an appreciable error signal may exist so that the chopped error signal will appear as a series of pulses having a considerable amplitude.

The programmed chopping action, however, provides only short bursts of energy during the initial stages of the transition. These short bursts of energy accumulate in the filter and permit only a gradual rise in capacitor voltage during this interval. As the transition period progresses, the pulse duration increases, thus gradually increasing the capacitor voltage.

In practice, the filter has a time constant several times greater than the period of the oscillator and the resistance-capacitance network in the controlled means 19 has a time constant many times greater than the period of the oscillator.

In some applications, it may be desired to provide pulse input signals to the load. This can be accomplished by choosing the oscillator frequency or changing the filter time constant so that the pulses will not be smoothed by the filter.

For instance, if the controlled device contains moving elements in which static friction must be overcome before control can be effected, the short initial bursts available under these conditions help to overcome the static friction so as to "break loose" the moving element. Yet the short duration of these initial bursts does not permit the moving element to gain undesired momentum or to overshoot.

Since the total energy expended in moving such elements is applied intermittently and gradually, the acceleration of such elements can be held to desired levels.

It will be noted that substantially the full amplitude of the error signal is applied to the controlled device under these conditions, even in the initial portions of the switching cycle.

In switching from the automatic to the manual mode, the control voltage may be scheduled to increase gradually at the same or at a different rate as desired for the particular application.

In the presently preferred embodiment of FIG. 1, the control means includes a timing network 75. This may conveniently take the form of a resistance-capacitance network as shown. Also in this embodiment, the charging and the discharging times of the capacitor 77 may be made to have different values by shunting one of the resistors 79 by a diode 81. A charging voltage is applied to the control circuit through a mode selector switch 83.

When the switch 83 is closed so that the circuit operates in the manual mode, the full charging voltage is applied to the timing network and the capacitor 77 becomes charged to the maximum level permitted by the charging voltage.

The charging voltage is selected to have a magnitude that provides sufficient offset to the triangular voltage wave to maintain this wave continuously above the threshold value as pictured in FIG. 4. This prevents any error signal from reaching the load.

When the controlled device is to be operated in the automatic mode, the mode selector switch 83 is opened. This permits the capacitor 77 to discharge gradually through the various resistors in the resistance-capacitance network. As the charge on the capacitor 77 decays, the offset triangular voltage wave descends through the threshold level and bursts of error signal are permitted to reach the load.

The diode 81 serves to short out the resistor 79 during the charging cycle. Thus when the circuit is switched to the manual mode, the capacitor 77 can charge rapidly and a relatively quick transition from the automatic to the manual mode can be realized.

Although a particular generator of triangular waves has been described for the oscillator 21, it will be appreciated that a wide variety of oscillators may be used for this purpose. Any suitable source of nonrectangular waves may be used for this purpose. The rate of change of error signal duration applied to the load will, of course, depend on the oscillator output wave shape.

Similarly, although transistors of a given conductivity type have been described, it will be obvious to those skilled in the art that other types of transistors or their vacuum tube equivalents may be used when desired.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. In combination: a source of error signals; filter means connected to receive error signals; a source of chopping signals; means to divert any error signal from said filter during the occurrence of a chopping signal; time delay means for producing a gradually changing control voltage; means to adjust the duration of the chopping signals as a continuous function of the instantaneous amplitude of said control voltage; and means to couple a load to be controlled to the output of said filter means.

2. In combination: a source of error signals; means to couple a substantially constant fraction of any error signal to a load to be controlled; a source of constant amplitude chopping signals; means to divert any error signal from the load to be controlled during the occurrence of a chopping signal; a time delay network for producing a gradually changing control voltage; and means to adjust the duration of the chopping signals as a continuous function of the instantaneous amplitude of said control voltage.

3. In combination: a source of error signals; means to couple a substantially constant fraction of any error signal to a device to be controlled; a source of chopping pulses; means to shunt any error signal around the device to be controlled during the occurence of a chopping pulse; voltage responsive means to adjust the duration of said chopping pulses; a resistance-capacitance time delay network; a timing capacitor in said network; and means to apply the voltage across said capacitor as a control voltage to said voltage responsive means.

4. In combination: a source of error signals; a source of rectangular chopping pulses; chopping means to divert any error signal existing during the occurrence of a chopping pulse; voltage responsive means to adjust the duration of the chopping pulses; a resistance-capacitance time delay network; a timing capacitor in said network; means to apply the voltage across said capacitor as a control voltage to said voltage responsive means; filtering means to smooth the pulsating wave shape of the undiverted portion of the error signal; and means to couple the output of said filtering means to a device to be controlled.

5. In combination: a source of error signals; filter means connected to receive error signals from said source; a source of constant amplitude chopping pulses; means to divert any error signal from the filter during the occurrence of a chopping pulse; voltage responsive means to adjust the duration of said chopping pulses; a source of charging voltage; a timing capacitor; a resistance network; a mode switch connected to couple said capacitor to said charging voltage through said resistance network; resistors in said network connected to discharge said capacitor when said mode switch is opened; means to apply the voltage on said timing capacitor to said voltage responsive means; said filter means having a time constant long enough to provide a smoothed voltage indicative of the error signal pulses reaching the filter; and means to apply the output of said filter to a device to be controlled.

6. In combination: an oscillator; means to add an adjustable DC component to the output of said oscillator so as to produce an offset oscillator voltage; means to provide a chopping signal whenever the instantaneous value of the offset oscillator voltage exceeds a specified threshold value; means to couple an error signal to a load; chopping means to prevent the error signal from reaching the load during the occurrence of a chopping signal; and means to adjust said DC component according to a desired schedule.

7. In combination: a source of triangular voltage waves; means to add an adjustable DC component to the triangular waves so as to provide an offset triangular wave; means to provide a chopping signal whenever the instantaneous value of the offset triangular wave exceeds a specified threshold value; means to couple an error signal to a load; chopping means to prevent the error signal from reaching the load during the occurrence of a chopping signal; and means to adjust said DC component according to a desired schedule.

8. In combination: a source of triangular voltage waves; control means to add a DC control voltage to the triangular waves so as to provide an offset triangular wave; means to provide a chopping signal whenever the instantaneous value of the offset triangular wave exceeds a specified threshold value; means to couple an error signal to a load; chopping means to prevent the error signal from reaching the load during the occurrence of a chopping signal; a resistance-capacitance network in said control means; a capacitor in said network connected to provide a DC control voltage indicative of the charge on the capacitor; means to apply a charging voltage to said network sufficient to provide an offset triangular wave that continuously exceeds said threshold value; and means to remove said charging voltage.

9. In combination: a source of triangular voltage waves; control means to add a DC control voltage to the triangular waves from said source so as to provide an offset triangular wave; means to provide a chopping signal whenever the instantaneous value of the offset triangular wave exceeds a specified threshold value; means to couple an error signal to a load; chopping means to prevent the error signal from reaching the load during the occurrence of a chopping signal; a parallel resistance-capacitance network in said control means, said network being connected to provide different charge and discharge times; a capacitor in said network connected to provide a DC control voltage indicative of the charge on the capacitor; means to apply a charging voltage to said network sufficient to provide an offset triangular wave that continuously exceeds said threshold value; and means to remove said charging voltage.

10. In combination: an oscillator; control means to adjust the quiescent voltage level of the oscillator output voltage so as to provide an offset oscillator voltage; a squaring amplifier connected to receive the offset oscillator voltage; means to bias the amplifier to cutoff, said biasing means being adjusted so that the amplifier will provide an output signal only when the instantaneous value of the offset oscillator voltage exceeds a threshold value; means to couple an error signal to a load; means to prevent an error signal from reaching the load during the occurrence of an output signal from said amplifier; and timing means in said control means to change the quiescent voltage level of the oscillator voltage at a desired rate.

11. A damped switching circuit comprising an oscillator; a squaring amplifier connected to receive the output voltage of said oscillator; means to bias said squaring amplifier at a cutoff level greater than the peak-to-peak output voltage of said oscillator; a source of adjustable DC control voltage having a maximum possible level sufficient to overcome said bias voltage; summing means to add the control voltage to the oscillator output voltage being applied to the squaring amplifier whereby an amplifier output voltage is obtained only while the sum of these voltages exceeds the bias level; means to couple an error signal to a device to be controlled; chopping means to shunt an error signal around the device to be controlled in response to an output voltage from said squared amplifier; and means for changing the control voltage at a predetermined rate.

12. A damped switching circuit comprising an oscillator; a squaring amplifier connected to receive the output voltage of said oscillator; means to bias said squaring amplifier at a cutoff level greater than the peak-to-peak output voltage of said oscillator; a source of adjustable DC control voltage having a maximum possible level sufficient to overcome said bias voltage; summing means to add the control voltage to the oscillator output voltage being applied to the squaring amplifier whereby an amplifier output voltage is obtained only while the sum of these voltages exceeds the bias level; means to couple an error signal to a device to be controlled; and chopping means to shunt an error signal around the device to be controlled in response to an output voltage from said squared amplifier.

13. In combination: a source of triangular voltage waves; control means to adjust the quiescent voltage level of the triangular voltage waves from said source; a squaring amplifier connected to receive the offset triangular voltage waves; means to bias the amplifier to cutoff, said biasing means being adjusted so that the amplifier will provide an output signal only when the instantaneous value of the offset triangular wave exceeds the threshold value; a source of error signals; means to couple an error signal to a load; a chopping transistor connected in shunt relationship with the load; means to bias said chopping transistor to cutoff; means to saturate said chopping transistor during the occurrence of an output voltage from said amplifier; a resistance-capacitance network in said control means; a capacitor in said network connected to provide an output voltage from said control means that is proportional to the charge on the capacitor; means to charge said capacitor to a value sufficient to hold the chopping transistor continuously in the saturated condition; and means to disconnect the charging means so as to permit decay of the charge on the capacitor in said network.

References Cited

UNITED STATES PATENTS

| | | | |
|---|---|---|---|
| 3,013,159 | 12/1961 | Sautels | 307—88.5 |
| 3,011,117 | 11/1961 | Ford | 321—45 |
| 3,311,758 | 3/1967 | Irons | 307—88.5 |

ARTHUR GAUSS, *Primary Examiner.*

S. D. MILLER, *Assistant Examiner.*

U.S. Cl. X.R.

332—15; 307—228, 235, 237, 240, 253, 261, 264, 293, 301